United States Patent [19]
Mochida et al.

[11] Patent Number: 4,936,631
[45] Date of Patent: Jun. 26, 1990

[54] VEHICULAR SEAT

[75] Inventors: Yoshiharu Mochida; Hiroaki Iwamoto, both of Kanagawa, Japan

[73] Assignee: Ikeda Bussan Co., Ltd., Ayase, Japan

[21] Appl. No.: 420,524

[22] Filed: Oct. 12, 1989

[30] Foreign Application Priority Data

Jan. 31, 1989 [JP] Japan .................. 1-10724[U]

[51] Int. Cl.⁵ ............................................. A47C 7/02
[52] U.S. Cl. ................................... 297/452; 297/460
[58] Field of Search ............ 297/443, 444, 452, 460, 297/284

[56] References Cited

U.S. PATENT DOCUMENTS

| | | | |
|---|---|---|---|
| 3,154,345 | 10/1964 | Lambrecht | 297/444 X |
| 3,848,926 | 11/1974 | Kuroichi | 297/452 |
| 3,861,747 | 1/1975 | Diamond | 297/452 |
| 4,420,186 | 12/1983 | Vogt | 297/452 X |
| 4,527,832 | 7/1985 | McMains et al. | 297/443 X |
| 4,639,042 | 1/1987 | Lange | 297/443 X |

Primary Examiner—Peter A. Aschenbrenner
Attorney, Agent, or Firm—Foley & Lardner, Schwartz, Jeffery, Schwaab, Mack, Blumenthal & Evans

[57] ABSTRACT

Disclosure herein is a vehicular seat which comprises a seat cushion; a seatback arranged on a rear part of the seat cushion, the seatback including a seatback frame having opposed side portions; a plurality of spring wires extending between the opposed side portions of the seatback frame; and an inside pad including a cushion pad proper, and upper and lower frame parts which are embedded in the cushion pad proper and having mutually mating portions pivotally connected through connecting bands; and clips for connecting one of the mating portions to one of the spring wires.

9 Claims, 3 Drawing Sheets

VEHICULAR SEAT

BACKGROUND OF THE INVENTION

1. Field of the Invention

The present invention relates in general to vehicular seats, and more particularly, to vehicular seats of a type which is easily assembled.

2. Description of the Prior Art

In order to clarify the task of the present invention, one conventional vehicular seat of the above-mentioned type will be described with reference to FIGS. 4 and 5 of the accompanying drawings.

As shown in FIGS. 4 and 5, the vehicular seat 1 comprises generally a seat cushion 2, a seatback 3, a headrest 10 and a trim back board 13. The seatback 3 comprises a reversed U-shaped seatback frame 4 of pipe mounted on the seat cushion 2, outside pads 5 arranged besides opposed side portions of the frame 4, a plurality of S-shaped spring wires 6 extending between the opposed side portions of the frame 4, and an inside pad 7 arranged on the S-shaped spring wire wires 6.

As is seen from FIG. 5, clips 8 are employed for connecting a middle portion of the inside pad 7 to one of the springs 6.

As is best seen from FIG. 4, the inside pad 7 has a rectangular wire insert 9 embedded therein and has at its front middle portion a horizontally extending groove 7a. Thus, the inside pad 7 becomes to have upper and lower pad portions (no numerals) which are bounded by the groove 7a. The inside pad 7 further has at its back side a support wire 11 which extends along the groove 7a. The support wire 11 is welded to the wire insert 9.

In order to mount the inside pad 7 to the seatback frame 4 to which the headrest 10, the outside pads 5 and the trim back board 13 have been previously mounted, the following steps are used.

First, the inside pad 7 is brought to a position wherein, as is shown in FIG. 5, the upper end 7b of the inside pad 7 is pressed against the lower edge 10a of the headrest 10, and then, the lower pad portion of the pad 7 is pivoted forwardly upwardly about the groove 7a to facilitate insertion of a clip feeder 12 (viz., clip gun) into the back space defined behind the inside pad 7. Then, by manipulating the clip feeder 12, several clips 8 are fed to bind the support wire 11 of the inside pad 7 and one selected S-spring wire 6. Then, the lower pad portion is pivoted back to a position wherein the lower end 7c of the pad 7 is pressed against the seat cushion 2.

However, due to its inherent construction, the above-mentioned seat 1 has the following drawbacks.

That is, due to provision of the rectangular wire insert 9 in the inside pad 7, the flexibility of the inside pad 7 about the groove 7a is poor and thus it is difficult or at least troublesome to insert the clip feeder 12 into the desired position. Furthermore, the work for welding the support wire 11 to the wire insert 9 is troublesome. These matters cause an interruption of effective and ready assembling of the seat 1.

SUMMARY OF THE INVENTION

It is therefore an object of the present invention to provide a vehicular seat which is free of the above-mentioned drawbacks.

According to the present invention, there is provided a vehicular seat whose inside pad can be easily mounted to its proper position.

According to the present invention, there is provided a vehicular seat which comprises a seat cushion; a seatback arranged on a rear part of the seat cushion, the seatback including a seatback frame having opposed side portions; a plurality of spring wires extending between the opposed side portions of the seatback frame; and an inside pad including a cushion pad proper, and upper and lower frame parts which are embedded in the cushion pad proper and have mutually mating portions pivotally connected through pivot means; and connecting means for connecting one of the mating portions to one of the spring wires.

BRIEF DESCRIPTION OF THE DRAWINGS

Other objects and advantages of the present invention will become apparent from the following description w taken in conjunction with the accompanying drawings, in which.

DETAILED DESCRIPTION OF THE INVENTION

Figure 1:
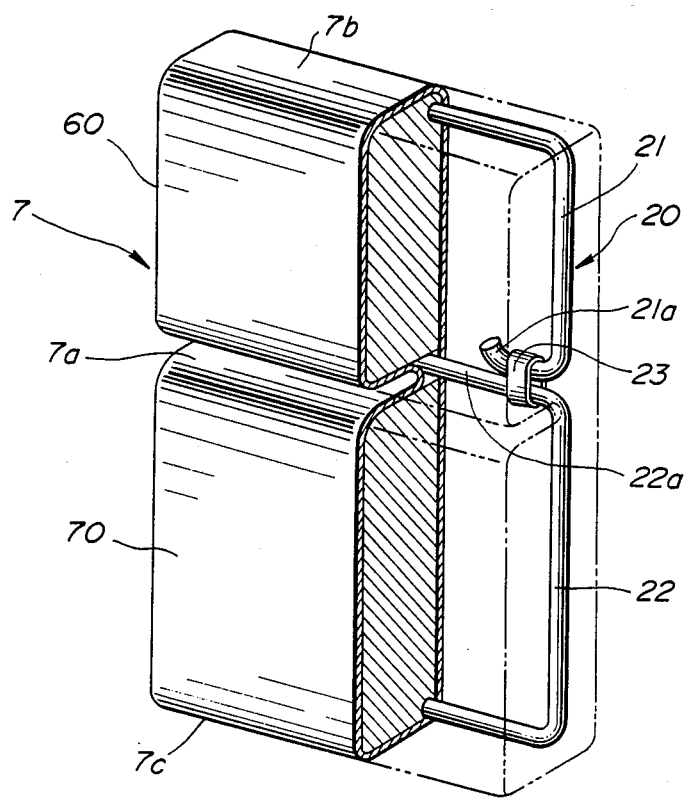
FIG. 1 is a partially cut perspective view or an inside pad employed in a vehicular seat of the present invention.
Figure 2:
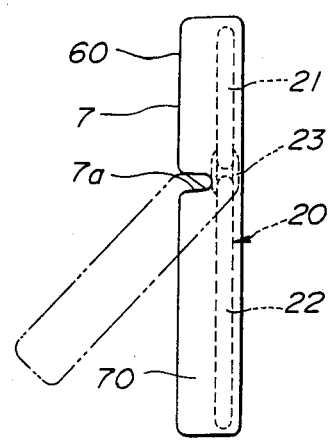
FIG. 2 is a side view of the inside pad.
Figure 3:
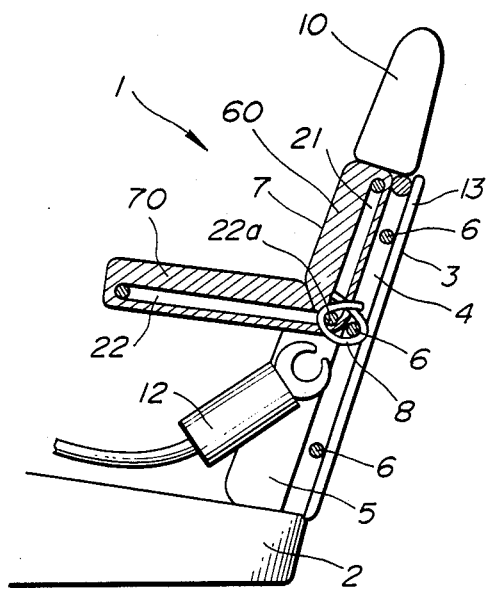
FIG. 3 is a side view of the vehicular seat of the present invention in a condition wherein the inside pad is being assembled.
Figure 4:
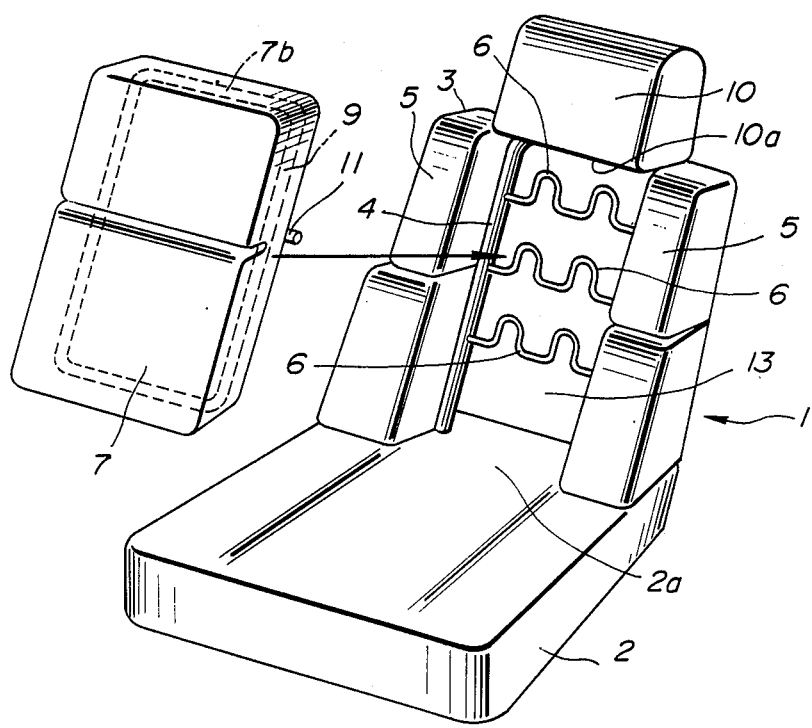
FIG. 4 is a perspective view of a conventional vehicular seat with an inside pad dislocated.
Figure 5:
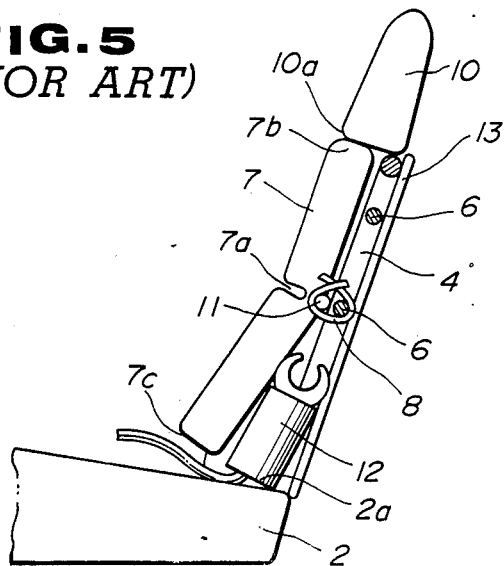
FIG. 5 is a side view of the conventional vehicular seat in a condition wherein the inside pad is being assembled.

Referring to FIGS. 1 to 3, particularly FIG. 3, there is shown a vehicular seat according to the present invention.

As is seen from FIG. 3, the seat of the invention comprises a seat cushion 2, a seatback 3 arranged at a rear portion of the seat cushion 2, a headrest 10 mounted on the seatback 3 and a trim back board 13 attached to a rear side of the seatback 3.

Similar to the above-mentioned conventional seat, the seatback 3 comprises a reversed U-shaped seatback frame 4 of pipe mounted on the seat cushion 2, outside pads 5 arranged besides opposed side portions of the frame 4, a plurality of S-shaped spring wires 6 extending between the opposed side portions of the frame 4, and an inside pad 7 arranged on the S-shaped spring wires 6.

In the present invention, the inside pad 7 has a unique construction as will be apparent from the following description.

As is best shown in FIG. 1, the inside pad 7 comprises a cushion pad proper (no numeral), a pivotally constructed wire insert 20 embedded in the pad proper. The cushion pad proper has at its front middle portion a horizontally extending groove 7a.

The wire insert 20 comprises a reversed U-shaped upper frame part 21 and a rectangularly extending lower frame part 22 (which will be named as rectangular lower frame part hereinafter) which are pivotally connected to each other through connecting bands 23. As shown, the upper frame part 21 has inwardly extending leading ends 21a which are pivotally connected, through the connecting bands 23, to an upper horizontal section 22a of the lower frame part 22. The upper horizontal section 22a of the lower frame part 22 is positioned behind and extends along the groove 7a, as shown. For the purpose which will become apparent hereinafter, the back side of the inside pad 7 has several clip openings (not shown) which are arranged along the upper horizontal section 22a of the lower frame part 22.

Thus, as will be understood from FIG. 2, the inside pad 7 becomes to have upper and lower pad portions 60 and 70 which are readily pivotal to each other about the groove 7a.

In order to mount the inside pad 7 to the seatback frame 4, the following steps are used. Similar to the case of the above-mentioned conventional seat, the headrest 10, the outside pads 5 and the trim back board 13 have been previously mounted to the seatback frame 4.

First, as will be understood from FIG. 3, the inside pad 7 is brought to a position wherein the upper end 7b (see FIG. 1) of the inside pad 7 is pressed against the lower edge 10a of the headrest 10, and then the lower pad portion 70 is pivoted forwardly upwardly about the groove 7a to carry out insertion of the clip feeder 12 into the back space defined behind the inside pad 7. It is to be noted that, due to the pivotal construction of the inside pad 7, the degree by which the lower pad portion 70 pivots is considerable as is seen from FIG. 3. Thus, the insertion of the clip feeder 12 into the desired position is easily carried out as compared with the aforementioned conventional case. Then, by manipulating the clip feeder 12, several clips 8 are fed to bind the upper horizontal section 22a of the lower frame part 22 and one selected S-spring wire 6. It is to be noted that each clip 8 passes through the corresponding clip opening of the inside pad 7. Then, the lower pad portion 70 is pivoted back to a position wherein the lower end 7c (see FIG. 1) is pressed against the seat cushion 2.

As will be understood from the above description, in accordance with the present invention, there is employed a pivotally constructed inside pad 7. Thus, as is described hereinabove, the insertion of the clip feeder 12 to the desired position is easily achieved. Furthermore, in the invention, the wire insert 20 of the inside pad 7 is connected to the selected S-spring 6 without using a separate member such as the support wire 11 of the conventional one. Thus, the number of parts used and the steps for assembling the seat are reduced.

In the following, modifications of the invention will be described.

The positional relationship between the upper and lower frame parts 21 and 22 of the inside pad 7 may be reversed. That is, the rectangular frame part 22 may be arranged above the reversed U-shaped frame part 21.

If desired, three or more than three frame parts may be used for constituting a multi-pivotal wire insert 20. In this case, adjacent two of the frame parts are pivotally connected in the above-mentioned manner.

What is claimed is:

1. A vehicular seat comprising:
   a seat cushion;
   a seatback arranged on a rear part of said seat cushion, said seatback including a seatback frame having opposed side portions; a plurality of spring wires extending between said opposed side portions of said seatback frame; and an inside pad including a cushion pad proper, and upper and lower frame parts which are embedded in said cushion pad proper and have mutually mating portions pivotally connected through pivot means; and
   connecting means for connecting one of said mating portions to one of said spring wires.

2. A vehicular seat as claimed in claim 1, in which said cushion pad proper of said inside pad has at its front side a groove which extends along one of said mutually mating portions.

3. A vehicular seat as claimed in claim 2, in which said upper frame part has a reversed U-shaped configuration and said lower frame part has a rectangular configuration.

4. A vehicular seat as claimed in claim 3, in which said reversed U-shaped upper frame part has inwardly extending leading ends which are pivotally connected, through said pivot means, to an upper horizontal section of said rectangular lower frame part.

5. A vehicular seat as claimed in claim 4, in which said pivot means comprises a connecting band.

6. A vehicular seat as claimed in claim 1, in which said seatback further comprises a headrest mounted on said seatback frame and outside pads arranged besides said opposed side portions of said seatback frame.

7. A vehicular seat as claimed in claim 6, in which said spring wire is of a S-shaped spring wire.

8. A vehicular seat as claimed in claim 7, in which said seatback further comprises a trim back board which covers a back side of said springs.

9. A vehicular seat as claimed in claim 6, in which said inside pad has an upper end pressed against a lower edge of said headrest and a lower end pressed against the seat cushion.

* * * * *